(12) United States Patent
Kedem

(10) Patent No.: US 6,233,696 B1
(45) Date of Patent: May 15, 2001

(54) DATA VERIFICATION AND REPAIR IN REDUNDANT STORAGE SYSTEMS

(75) Inventor: Ishay Kedem, Brookline, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 09/001,298

(22) Filed: Dec. 31, 1997

(51) Int. Cl.$^7$ .................................................. G06F 11/00
(52) U.S. Cl. ................................................ 714/6; 711/114
(58) Field of Search ........................ 714/6, 44; 711/114

(56) References Cited

U.S. PATENT DOCUMENTS

| | | |
|---|---|---|
| 5,341,493 | 8/1994 | Yanai et al. . |
| 5,446,888 * | 8/1995 | Pyne ...................................... 395/600 |
| 5,455,934 * | 10/1995 | Holland et al. ....................... 395/404 |
| 5,530,948 * | 6/1996 | Islam ................................. 395/182.04 |
| 5,537,568 | 7/1996 | Yanai et al. . |
| 5,619,690 * | 4/1997 | Matsumani et al. .................. 395/616 |
| 5,664,144 | 9/1997 | Yanai et al. . |
| 5,720,025 * | 2/1998 | Wilkes et al. .................... 395/182.04 |
| 5,737,744 * | 4/1998 | Callison et al. ...................... 711/114 |
| 5,761,705 * | 6/1998 | DeKoning et al. ................... 711/113 |
| 5,845,328 * | 12/1998 | Maya et al. ........................... 711/162 |
| 5,883,904 * | 3/1999 | Arimilli et al. ...................... 371/10.2 |
| 5,889,934 * | 3/1999 | Peterson ........................... 395/182.04 |

OTHER PUBLICATIONS pp. 96–97, excerpt from "The RAIDbook, A Source Book For Disk Array Technology," published by The RAID Advisory Board, St. Peter, Minnesota (5th Ed., Feb., 1996).
pp. 121–122, excerpt from "The RAIDbook, A Source Book For Disk Array Technology," published by The RAID Advisory Board, St. Peter, Minnesota (5th Ed., Feb., 1996).
pp. 133–134, excerpt from "The RAIDbook, A Source Book For Disk Array Technology," published by The RAID Advisory Board, St. Peter, Minnesota (5th Ed., Feb., 1996).

* cited by examiner

*Primary Examiner*—David A. Wiley
(74) *Attorney, Agent, or Firm*—Wolf, Greenfield & Sacks, P.C.

(57) ABSTRACT

Method and apparatus for identifying data coherence problems in a storage system including redundant information are disclosed. A first copy of a data unit is compared with a generated copy of the data unit, to identify mismatched data. The redundant information may be parity information in a RAID architecture. The method and apparatus may repair data coherence problems.

32 Claims, 12 Drawing Sheets

DATA VERIFICATION AND REPAIR IN REDUNDANT STORAGE SYSTEMS

FIELD OF THE INVENTION

This invention relates to data storage for computers, and more particularly to method and apparatus for diagnosing and repairing data stored in a system including redundant information.

SUMMARY OF THE RELATED ART

Relatively early in the development of computer systems, disk drives became a fundamental device for storage. Accordingly, computer operating systems and application programs have been developed assuming that memory will rely on input/output ("I/O") to a disk drive. The demand for storage has also skyrocketed. As a result a number of separate physical devices may be required to accommodate the total amount of storage required for a system.

The result, described briefly below, is that a number of strategies have developed for placing data onto physical disk drives. Indeed, there are a variety of ways of mapping data onto physical disks, as is generally known in the art.

It would be highly inefficient, however, to have to change the operating system and/or application programs every time a change is made to the physical storage system. As a result, there has been a conceptual separation of the application's view of data storage and the actual physical storage strategy.

FIG. 1 illustrates this concept. The application/operating system's view of the storage system contemplates three separate storage devices—logical volume A 10, logical volume B 11, and logical volume C 12. Thus, as far as the operating system can discern, the system consists of three separate storage devices 10–12. Each separate storage device may be referred to as a "logical volume," "logical disk," or "virtual disk." These names reflect the fact that the application's (or operating system's) logical view of the storage device structure may not correspond to the actual physical storage system implementing the structure.

In FIG. 1, the data is physically stored on the physical storage devices 14–16. In this particular example, although there are three physical devices 14–16 and three logical volumes 10–12, there is not a one to one mapping of the logical volumes to physical devices. In this particular example, the data in logical volume A 10 is actually stored on physical devices 14–16, as indicated at 10*a*, 10*b* and 10*c*. In this example, logical volume B is stored entirely on physical device 14, as indicated at 12*a*, 12*b*. Finally, logical volume C is stored on physical device 14 and physical device 16 as indicated at 11*a*, 11*b*.

In this particular example, the boxes 10*a*–10*c*, 11*a*–11*b* and 12*a*–12*b* represent contiguous segments of storage within the respective physical devices 14–16. These contiguous segments of storage may, but need not, be of the same size.

Array management software running on a general purpose processor (or some other mechanism such as a custom hardware circuit) 13 translates requests from a host computer (not shown) (made assuming the logical volume structure 10-12) into requests that correspond to the way in which the data is actually stored on the physical devices 14–16. In practice, the array management software 13 may be implemented as a part of a unitary storage system that includes the physical devices 14–16, may be implemented on a host computer, or may be done in some other manner.

The physical storage devices shown in FIG. 1 are disk drives. Disk drives include one or more disks of a recording media (such as a magnetic recording medium or an optical recording medium). Information can be written and read from the storage medium for storage purposes. The recording medium is typically in the form of a disk that rotates. The disk generally includes a number of tracks on which the information is recorded and from which the information is read. In a disk drive that includes multiple disks, the disks are conventionally stacked so that corresponding tracks of each disk overlie each other. In this case, specification of a single track on which information is stored within the disk drive includes not only specification of an individual track on a disk, but also which of the multiple disks the information is stored on.

Data on each physical device 14-16 may be stored according to one or more formats. Similarly, the request for data from the operating system or application program may correspond to one or more such formats. For example, large disk storage systems employed with many IBM mainframe computer systems implement a count, key, data ("CKD") record format on the disk drives. Similarly, programs on such computers may request and expect to receive data according to the CKD record format. In the CKD format, the record includes at least three parts. The first part is a "count," which serves to identify the record and indicates the lengths of the (optional) key field and the data portion of the record. The key field is an optional field that may include information about the record. The "data" portion of the record includes the actual user data stored by the record. The term "data" refers to any information, including formatting information of a record. "Actual user data" refers to the data actually desired for use by the host computer, such as the information in the data field of a CKD record.

Disk drives that do not employ a CKD record format typically use a fixed block architecture ("FBA") format. In an FBA storage system, each track of a disk is divided into a number of blocks, each having the same size.

Of course, it is possible to use an FBA disk drive system to store data formatted according to the CKD record format. In this case, the array management software 13 must perform the necessary translations between the CKD and FBA formats. One mechanism for performing this function is described in U.S. Pat. No. 5,664,144, entitled "System and method for FBA formatted disk mapping and variable length CKD formatted data record retrieval," issued on Sep. 2, 1997.

In a system including an array of physical disk devices, such as disk devices 14–16 of FIG. 1, each device typically performs error detection and/or correction for the data stored on the particular physical device. Accordingly, each individual physical disk device detects when it does not have valid data to provide and, where possible, corrects the errors. Even where error correction is permitted for data stored on the physical device, however, a catastrophic failure of the device would result in the irrecoverable loss of data.

Accordingly, storage systems have been designed which include redundant storage capacity. A variety of ways of storing data onto the disks in a manner that would permit recovery have developed. A number of such methods are generally described in the RAIDbook, A Source Book For Disk Array Technology, published by the RAID Advisory Board, St. Peter, Minn. (5th Ed., February, 1996). These systems include "RAID" storage systems. RAID stands for Redundant Array of Independent Disks.

FIG. 2A illustrates one technique for storing redundant information in a RAID system. Under this technique, a plurality of physical devices 21–23 include identical copies of the data. Thus, the data M1 can be "mirrored" onto a portion 21a of physical device 21, a portion 22a of physical device 22 and a portion 23a of physical device 23. In this case, the aggregate portions of the physical disks that store the duplicated data 21a, 22a and 23a may be referred to as a "mirror group." The number of places in which the data M1 is mirrored is generally selected depending on the desired level of security against irrecoverable loss of data.

FIG. 2A shows three physical devices 21–23 which appear to be located in close proximity, for example within a single storage system unit. For very sensitive data, however, one or more of the physical devices that hold the mirrored data may be located at a remote facility. "RAID 1" is an example of data redundancy through mirroring of data. In a RAID 1 architecture, a number of different mechanisms may be used for determining how to access and update data to improve, for example, performance of the storage system. In any event, a RAID 1 architecture certainly has the ability to recover lost data. Unfortunately, the RAID 1 architecture multiplies the cost of physical storage by the number of "mirrors" included in the mirror group.

FIG. 2B illustrates a solution that requires less added storage. In FIG. 2B, data is stored at locations 24a–24d. In this particular example, the physical device 23 includes parity information P1 at 25a, 25b. The parity information is generated by a simple exclusive-OR ("XOR") of the corresponding bits of data. Thus, the parity information P1 would be generated by XORing the corresponding bits of the data D1 and data D2.

While "parity" redundancy is used in the illustrative examples of the present application, this is not intended as limiting. The invention may be applied, based on the disclosure herein, to other schemes that use more than a single bit to record error detection or correction information. For example, aspects of the invention may be applied to a RAID 2 system that uses Hamming codes for error correction.

A variety of mechanisms are known for distributing the parity information on the physical devices. In the example shown in FIG. 2B, all of the parity information is stored on a single physical device 23. In other cases, the parity information may be distributed across the physical devices.

In the event that parity data is not all stored in the same physical device, the parity segments may be allocated to physical storage devices in units the size of the smallest writable segment of disk memory, or more. Indeed, parity for an entire logical volume may be allocated to a single physical storage device before parity is designated for storage on a different physical device. For both mirror groups and redundancy groups in a disk system, data is updated in discrete portions. In a disk system, there is a smallest unit of data that may be written from or read to the disk. In an FBA architecture, this unit is a single "block" of data, having a fixed size. This size may be, for example, 512 bytes. In a CKD architecture, the smallest unit of data that may be written is a CKD record (of variable length). In a random access memory, the smallest unit is often a byte or 16 (or 32) bit word. In any event, "write unit" will refer to the smallest unit of data that may be read or written from the disk storage system. The amount of parity information written on as physical storage unit, before storing parity on a different physical storage unit, may or may not correspond to the size of the write unit.

Within a given disk array, there is no need for all of the data to follow the same redundancy rule.

FIG. 3 illustrates this concept. In FIG. 3, a first group of storage segments on physical devices 30–32 form a mirror group 34. In the mirror group 34, the entire contents of a single logical volume (LV-A) are mirrored on three different physical devices 30–32.

In FIG. 3, a single logical volume is stored on the fourth physical device 33, without any redundancy information, as indicated at 36.

Finally, a last group of data segments 35 on all four physical devices 30–33 implement a parity redundancy scheme. In this particular example, the parity information is stored in segments of memory on two different physical devices 32–33, as indicated at 37a and 37b.

The data segments in the mirror group 34 and parity group 35 may each be referred to as part of their corresponding "redundancy group." Mirror group 34 and parity group 35 both include redundant information, although stored in different ways—the former as a copy of the information, the latter as parity information from which a copy of the information may be derived.

SUMMARY OF THE INVENTION

According to one embodiment of the present invention, a method of determining if a data coherence problem exists in a storage system is disclosed. According to this embodiment, a data unit format value, stored in each copy of a plurality of corresponding copies of a data unit, is compared with a known correct value. Based on the comparison, copies which do not include correct data are identified. The data unit may be stored on one of a plurality of mirrors in the storage system and may be a fixed block size. The method may include the step of repairing data units determined not to be correct. The data unit format value may vary, depending on the intended physical location of the data unit in the respective mirror. For example, the data unit format value may include a logical block address.

According to another embodiment of the present invention, a storage system is disclosed. According to this embodiment, the storage system includes a plurality of storage devices, storing a redundancy group. The storage system includes a data coherence tester, that comprises means for comparing a data unit format value, stored in each corresponding copy of a data unit, with a correct value known in advance. The storage system may include means for determining which of the copies do not have correct data.

According to another embodiment of the present invention, a method of determining if a data coherence problem exists in a storage system is disclosed. According to this embodiment, a plurality of corresponding copies of a data unit are provided. The method determines whether a data coherence problem exists among the copies, but without an exhaustive examination of the actual user data in the data unit. The step of determining whether a data coherence problem exists may comprise a step of comparing error code information stored in corresponding copies of the data unit. The data unit itself may be stored on one of a plurality of mirrors in the storage system.

According to another embodiment of the present invention, a storage system is disclosed. According to this embodiment, the storage system comprises a plurality of storage devices to store a redundancy group. The storage system further includes a data coherence tester, to identify data coherence problems among corresponding copies of one of the data units stored on the storage devices. The data coherence tester includes means for determining whether a data coherence problem exists, without an exhaustive examination of the actual user data in the data unit.

According to another embodiment of the present invention, a method of determining if a data coherence problem exists between a plurality of copies of a data unit is disclosed. According to this embodiment, data unit composition information in each corresponding copy of a data unit is examined to determine if one of the copies does not contain up to date information. The method includes a step of comparing actual user data stored in the copies, if a data coherence problem is not identified when the data unit composition information is examined. The data unit may be stored on a plurality of mirrors in the storage system. The method may include a step of identifying at least one of the copies of the data unit that has up to date information. The data unit composition information may be a mask field intended to indicate invalid mirrors of the corresponding data, or may comprise an error code, such as a cyclic redundancy code.

According to another embodiment of the present invention, a storage system is disclosed, which includes a plurality of storage devices in a data coherence tester. The data coherence tester is to identify data coherence problems among corresponding copies of a data unit. The data coherence tester may comprise means for examining data unit composition information to determine if a copy does not contain up to date information and means for comparing actual user data of the copies of the data unit, where the means for examining does not identify the copy as having data that is not up to date.

According to another embodiment of the present invention, a method of determining if a data coherence problem exists between a plurality of mirrors of segments of data, each segment of data including a plurality of data units, is disclosed. According to this embodiment, a respective copy of a data unit from each respective segment of data is read and examined to determine if subsequent data units in the respective segments of data do not have up to date information. The examination may include comparing a count field of a CKD record for each of the respective copies.

According to another embodiment of the present invention, a storage system is disclosed which includes a plurality of storage devices storing a plurality of mirrors of data. This embodiment includes a data coherence tester that includes means for examining a respective copy of a data unit to determine if subsequent data units in the respective segments of data do not have up to date information.

According to another embodiment of the present invention, a method of resolving a data coherence problem existing among a plurality of mirrored copies of data units is disclosed. According to this embodiment, the mirrored copies of the data units are examined to identify which have a data coherence problem, for those that have a data coherence problem at least one mirrored copy is identified that has up to date information, and the copies not having up to date information are updated.

According to another embodiment of the present invention, a storage system is disclosed, which includes a plurality of storage devices storing a plurality of mirrored copies of a plurality of data units. This embodiment includes a data coherence tester to examine the mirrored copies of the data units to identify those that have a data coherence problem and, for the identified copies, identifying at least one which has up to date information.

According to another embodiment of the present invention, a method of resolving a data coherence problem existing among a plurality of mirrored copies of a plurality of data units in the storage system is disclosed. According to this embodiment, a time stamp associated with each of the copies of the data units is provided, the time stamp indicating an increment of time sufficiently small to resolve between old data and up to date data for most updates to the copies. According to this method, the copy with the most recent time stamp is considered to be up to date. The time stamp may distinguish time in about two second increments or less. The method may include a step of determining that a data coherence problem exists among copies of the data unit.

According to another embodiment of the present invention, a storage system is disclosed which includes a plurality of storage devices that include a plurality of mirrored copies of data units. This embodiment includes a data coherence resolver, to resolve a data coherence problem based on a time stamp associated with each of the mirrored copies. The time stamp indicates an increment of time sufficiently small to resolve between old data and up to date data for most updates to the copies. The data coherence resolver may further comprise means for identifying data coherence problems among the mirrored copies of the data units.

According to another embodiment of the present invention, a method of diagnosing a data coherence problem in a storage system that stores a plurality of data segments on physical storage devices is disclosed. According to this embodiment, a first copy of one of the data segments is provided. A corresponding copy of the data segment is generated using redundant information stored in the storage system. The first copy and the corresponding copy are compared to determine when a data coherence problem exists between the first copy and the redundant information. The data segments may be a part of a parity redundancy group. The method may also include a step of identifying which among the one data segment and the redundant information is not up to date, when a data coherence problem is found. This may involve comparing a time stamp in the first copy with a time stamp in the corresponding copy. The data segment or redundant information may be repaired. The method may also include a step of determining whether the corresponding copy is a viable data segment. The determination of whether the corresponding copy is a viable data segment may be made by generating an error code for a data unit in the corresponding copy and comparing the generating error code with the error code stored in the corresponding copy. In another embodiment, the determination of whether the corresponding copy is a viable data segment may include the steps of determining an expected value for a field in a data unit in the corresponding copy, and comparing the expected value with the value stored in the corresponding copy.

According to another embodiment of the present invention, a storage system is disclosed, which includes a plurality of storage devices each storing a data segment, the data segments being in a redundancy group that includes redundant information. The storage system according to this embodiment also includes a data coherence tester, coupled to the storage devices. The data coherence tester generates a corresponding copy of one data segment and compares the corresponding copy with a copy of the one data segment, to determine when a data coherence problem exists between the first copy and the redundant information.

According to another embodiment of the present invention, a storage system is disclosed which comprises a plurality of storage devices, means for generating a corresponding copy of one data segment stored on one of the storage devices, and means for comparing a first copy of the one data segment with the corresponding copy, to determine when a data coherence problem exists between the first copy and redundant information stored in the storage system.

According to another embodiment of the present invention, a data verification process (including methods such as those described above) is initiated independent of any catastrophic failure of the storage system.

According to another embodiment of the present invention, a storage system is disclosed that includes a data coherence tester that initiates a data verification process independent of the occurrence of any catastrophic failure of the system.

According to another embodiment of the present invention, a method of data verification is disclosed. According to this method, the verification process proceeds while operating the storage system in a normal mode of operation.

According to another embodiment of the present invention, a storage system is disclosed which includes a data coherence tester that tests coherence of data among a plurality of storage devices during normal operation of the storage system.

DETAILED DESCRIPTION OF THE INVENTION

Figure 1:
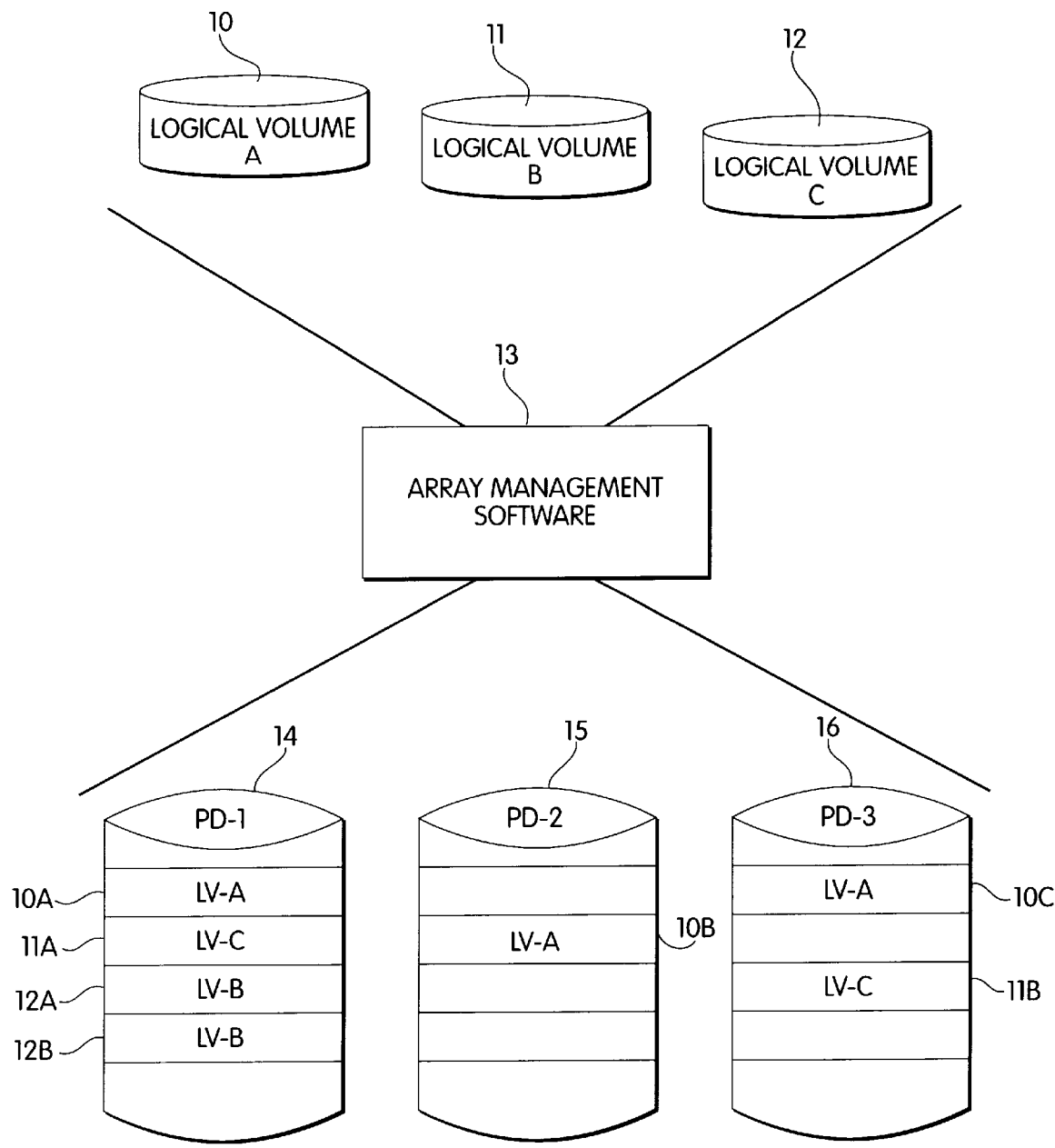
FIG. 1 illustrates the relationship between logical volumes and physical storage devices.
Figure 2A:
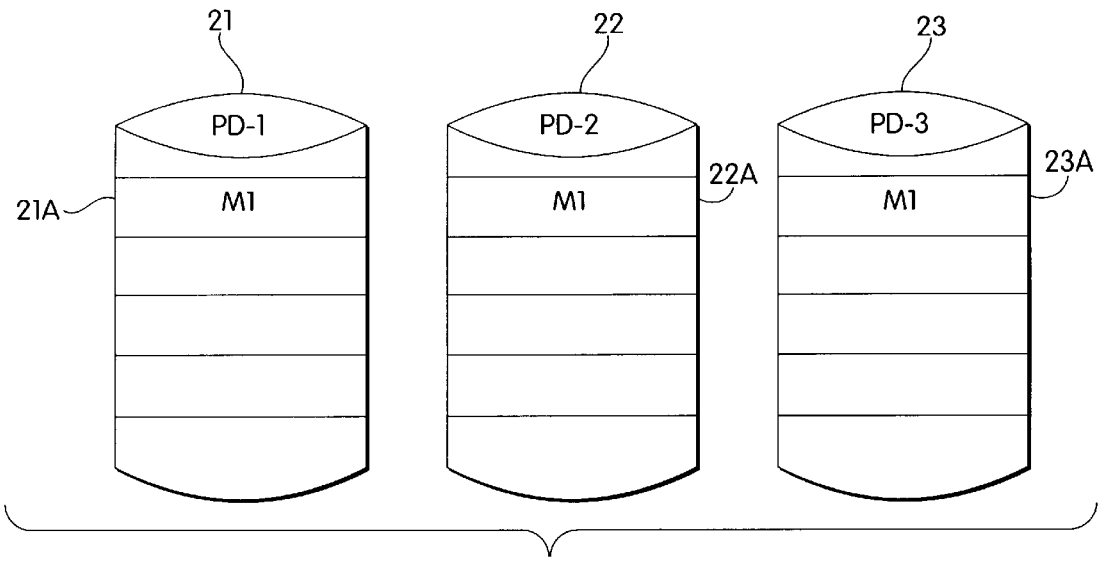
FIG. 2A illustrates an example of mirroring on different physical storage devices.
Figure 2B:
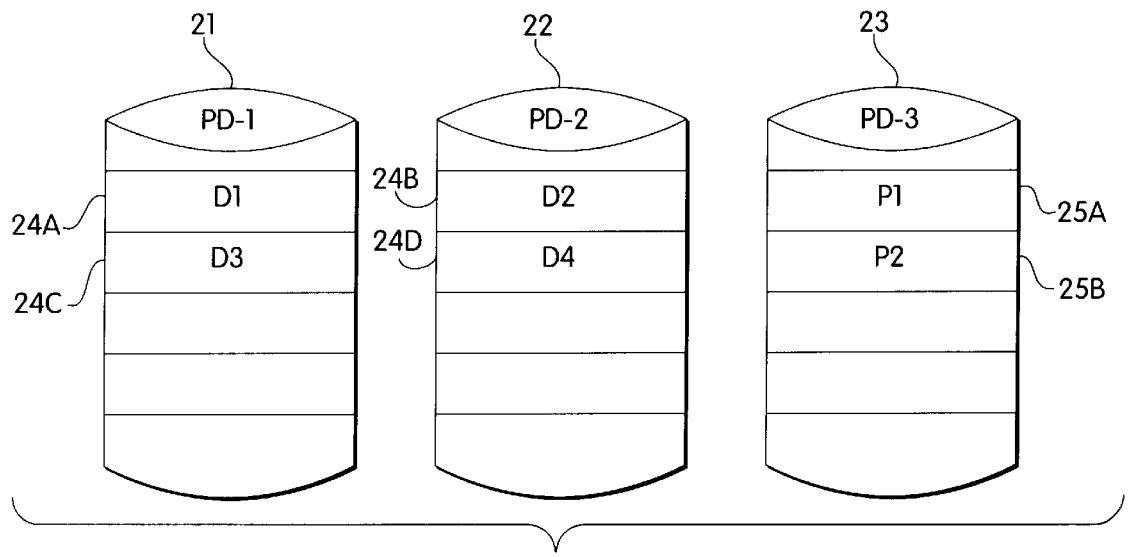
FIG. 2B illustrates an example of redundant parity information on physical storage devices.

As described above, disk storage systems may include redundant information (e.g., through mirroring or maintaining parity information) to assure that if a physical storage device is lost, the data that was stored on that device can still be recovered. Problems may arise in such a storage system, however, even without the catastrophic failure of one of the physical devices.

One problem arises from a failure to update information. For example, suppose that a storage system has a logical volume stored in two mirrors within a mirror group. If one of the mirrors is updated by a write, but the other mirror is not, the system cannot assure that the storage system is always providing the correct data. Indeed, in many mirroring systems, reads of data are alternated between mirrors. In this case, correct data can be read as the result of some read commands, but not other read commands (depending on which mirror is read from). Such a result is, of course, intolerable. In addition, if the updated mirror fails, the updated information is irrecoverably lost. A mismatching of data, such as what results from a partial failure to write updated information, is referred to as a "data coherence" problem.

Similarly, consider a RAID system including parity redundancy. Any writing of data necessarily involves writing at least two different physical devices—the physical device holding the corresponding parity information and the device holding the updated data (if the updated data is being stored on more than one physical storage device, then more than two physical storage devices may be updated for a given write of data). If the parity information is correctly updated, but one of the physical devices storing the actual data is not updated, then wrong data may be supplied to the application program. Similarly, if the data is updated, but parity is not, the system could no longer correctly recover from loss of one of the data storage devices.

This problem has been noted to arise as a result of a complete or catastrophic system failure. With a complete system failure (i.e., the entire system including all of the disk drives stop functioning at once), an ongoing write may have completed on one disk drive, but not the redundant disk drives. For example, a write may be pending to two different devices in a mirror group. The write may have completed on one of the devices, but not the other, at the time that the entire system went down.

In the case of a complete system failure, one solution is to attempt to find any failures at the time that the system went down, either by examining a backup log of pending writes (to assure that any writes pending at or just before the complete system failure were, in fact, completed) or by exhaustively examining the data on all of the drives before bringing the storage system back on-line. In the latter case, however, repair is not possible as the most that can be done is identification of an inconsistency. Such procedures are also costly, because they require that the system be down during checking of the data. In addition, this type of checking and repairing of data only occurs after a catastrophic system failure.

The problems caused by failure to update a disk can also arise, however, during normal operation of a system. For example, one or more failures within a physical storage device can cause no data to be written, or data to be written to the wrong location. In this case, as described above, the system will continue functioning on-line either using the wrong data, at risk of irrecoverable loss of data, or both.

Various embodiments of the present invention improve on known systems by advancing one or more of the following goals: the system can permit on-line initiation of checking and repair of redundant information in the storage system; checking and repair of redundant information can occur during normal operation of the storage device; and the system can permit fast, efficient and reliable checking and repair of redundant information. Other advantages will be apparent from the illustrative embodiments described below.

Figure 4:
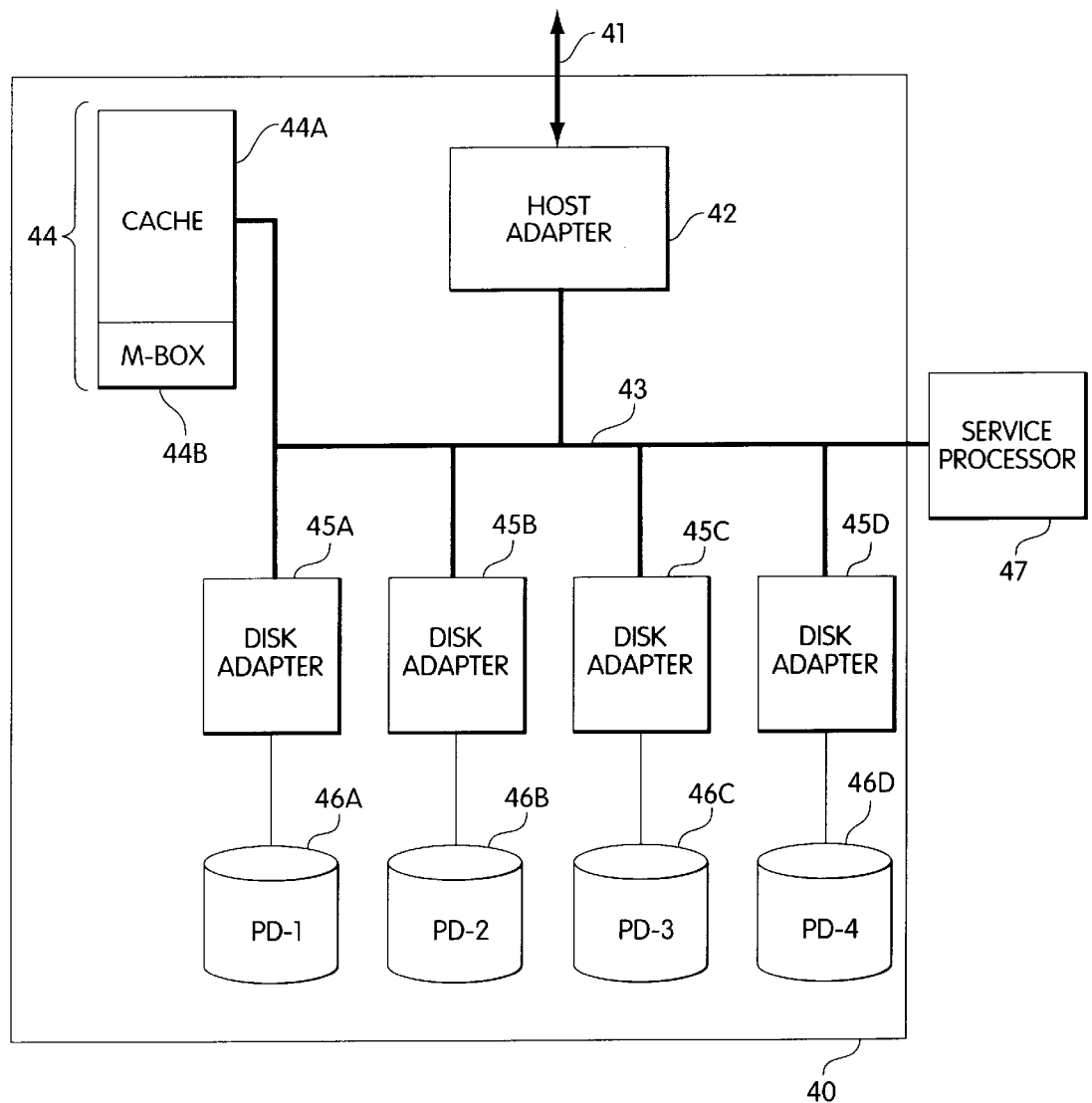
FIG. 4 illustrates one embodiment of a storage system for use with the present invention.

FIG. 4 illustrates one embodiment of a system which may be used or adapted in accordance with the present invention. The system in FIG. 4 corresponds generally to the Symmetrix storage system available from EMC Corporation, of Hopkinton, Mass. (The Symmetrix product line of integrated cached disk arrays is described in numerous publications from EMC Corporation, including the Symmetrix model 55XX product manual, P-N200-810-550, rev. F, February, 1996.) While the method and apparatus of the present invention may be described with reference to the system of FIG. 4, this is not intended to be limiting. The present invention has broader application. Certain aspects of the invention may be applied to any storage system that includes redundant information.

FIG. 4 shows a storage system 40 that may be connected to a host computer (not shown) using a channel or bus 41. The channel for communication with the host computer can be any suitable connection such as a Small Computer System Interface ("SCSI") or Enterprise Systems Connection Architecture ("ESCON"). While only one communication channel 41 into the storage system 40 is shown in FIG. 4, other channels may be included.

Figure 3:
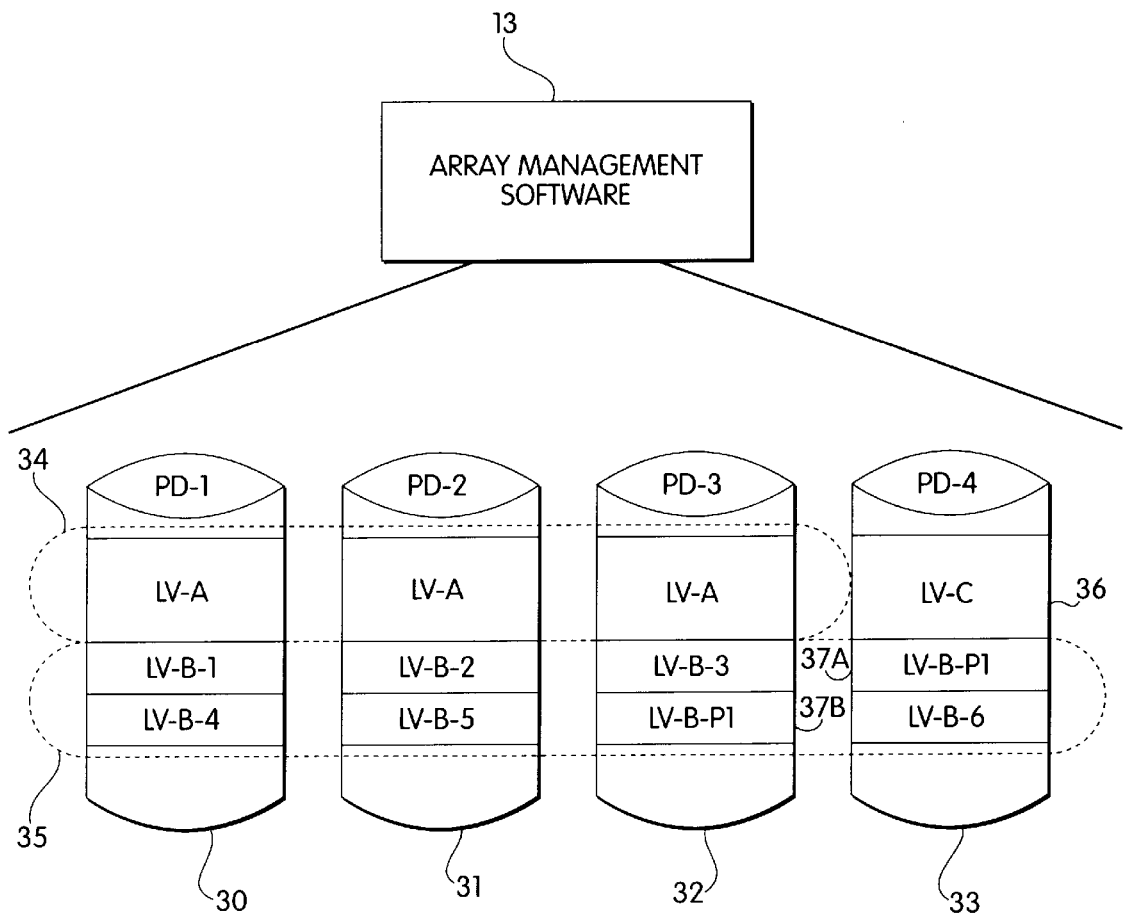
FIG. 3 illustrates an example of multiple redundancy groups within a single array of storage devices.

Within the storage system 40 is a host adapter 42. In this particular embodiment, the host adapter 42 is responsible for managing and translating read and write requests from the host computer (not shown), which are based on the virtual disk structure, into one or more requests corresponding to how data is stored on the actual physical storage devices 46a–46d included in the storage system 40. Thus, in this embodiment, the host adapter 42 implements the array management software 13 functions of FIGS. 1 and 3. The host adapter 42 can be implemented in any of a number of ways, including using a general purpose processor or a custom hardware implementation. In addition, multiple host adapters may be included to facilitate having additional I/O channels for the storage system 40.

The host adapter 42 communicates with the other components of the storage system 40 using bus 43. The bus 43 may be any suitable communication element, including use of SCSI, ESCON, and other bus protocols.

Access to the physical storage devices 46a–46d is controlled through the use of disk adapters 45a–45d. The disk adapter 45a–45d can also be implemented using a general purpose processor or custom hardware design. In the embodiment illustrated in FIG. 4, a disk adapter is provided for each physical storage device. A disk adapter can, of course, have more than one storage device attached to it. In addition, disk adapters may include secondary connections to the physical storage devices of another disk adapter. This permits recovery from failure of one disk adapter by shifting its functions to the second disk adapter.

In the embodiment of FIG. 4, reading and writing to the physical storage device 46a–46d through the disk adapters 45a–45d is facilitated through use of a cache 44. The cache 44 may be a random access memory having greater speed than the disk drives. When reading data, if the data is being temporarily stored in the cache, the read request can be fulfilled more quickly by taking the data from the cache 44. Similarly, when writing data, the data to be written can be stored in the cache. The other components of the system can proceed, while the data is written from the cache to the applicable physical storage device.

Any of a variety of mechanisms can be used to implement and manage the cache. An example of such a mechanism is included in U.S. Pat. No, 5,537,568, entitled "System for dynamically controlling cache manager maintaining cache index and controlling sequential data access," issued on Jul. 16, 1996. Similarly, writes may be accomplished through the cache using any of a variety of mechanisms and strategies. One mechanism for writing from the cache is to store the data to be written in the cache, and mark a "write pending" bit. When the write pending bit is encountered, the applicable data can be written to the disk. This technique is described generally in U.S. Pat. No. 5,341,493, entitled "Disk storage system with write preservation during power failure," issued on Aug. 23, 1994.

The cache may be divided into more than one area. For example, the cache may include an area 44a for storing data being read or written from physical storage devices 46a–46d. The cache may further include a "mailbox" area 44b. The mailbox area 44b may be used to facilitate communications among the disk adapters 45a–45d and with the host adapter 42. For example, each disk adapter may have its own area within the mailbox 44b. Each of the disk adapters 45a–45d can post or read information from the applicable mailbox area 44b, to communicate status and other information.

A service processor 47 may be coupled to the bus 43 of the storage system 40. The service processor 47 may include a display, keyboard and other I/O devices to permit an operator to use the service processor 47 for configuring the components of the storage system 40 and for running or initiating diagnosis and maintenance facilities.

As described above, the host computer may expect to read and write data according to one of a variety of formats. For example, the data may be formatted according to the CKD data format or the FBA format.

The illustrative embodiments described below will focus on the CKD format. Many aspects of the present invention, however, have broader application. Modification of these aspects for use with the FBA format is straightforward, based on the disclosure provided herein.

Figure 5:
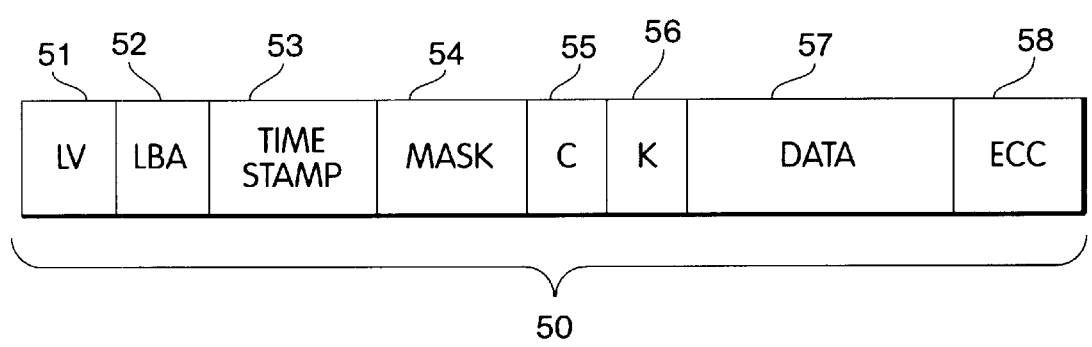
FIG. 5 illustrates an example of a format for a CKD record, used in connection with one embodiment of the present invention.

FIG. 5 illustrates an example of a record 50, according to the CKD format, that may be stored in a physical storage device according to one embodiment of the present invention. Thus, in reading a record 50 from the physical storage device, all of the fields 51–58 will be retrieved. The actual record returned to the host computer, however, may be limited to the standard CKD fields 55–57.

The record 50 includes a logical volume field 51. This field specifies the logical volume corresponding to the record. Thus, every record within a logical volume would have the same value for the logical volume field 51.

In this particular embodiment, the record 50 also includes a logical block address field 52. This field stores the logical block address of the record 50.

In this embodiment, the record 50 further includes a time stamp field 53. As described below, a purpose of the time stamp field is to determine which record was written more recently. Accordingly, the number of bits in the field should be sufficient to record the time of writing within a sufficiently small period of time to distinguish between writes initiated at different times. For many implementations, a time stamp of thirty bits, permitting resolution of the time of write to a two second interval, is sufficient. In this embodiment, the time stamp field reflects the time of writing data to the disk drive. This may be done by the disk drive itself or the respective disk adapter. An additional or alternative time stamp, reflecting the time of writing by the host computer, and recorded by the applicable host adapter, could also be employed.

The record 50 may further include a mask field 54. The mask field may be used to record on each record the status of the records. For example, if one of the corresponding records in a redundancy group includes faulty data, the identity of the faulty drive can be recorded in the mask field 54.

The record includes a count field 55, a key field (optional) 56 and a data field 57, as is done for records stored in the CKD format.

Finally, the record 50 can include an error code field 58. This field stores error detection and/or correction bits calculated for the record 50. The error correction field 58 may be as simple as a parity bit for the entire record 50 or a cyclic redundancy code for only some fields in the record. In most cases, more bits are used. In addition, multiple error correction fields may be included, using more than one error correction technique. Typically, the fields other than CKD fields 55–57 are determined and included in the record by the applicable disk adapter. Of course, other mechanisms can be used to add some or all of such fields.

As described above, data coherence problems can arise even during normal operation of a storage system. The following method of data verification and repair may be implemented during normal operation of a storage system. For example, the methods described below may be performed: continuously in the background while the storage system continues to function on-line; can be run periodically according to a maintenance schedule, such as once every week; or may be initiated on observing system parameters that indicate that a data coherence problem may arise or may have arisen. The process may also be initiated on routine events, such as a change of state of the storage system, e.g., bringing the storage system on-line or off-line. In addition, checking redundancy groups may be initiated on observing heavy (or a particular amount of) activity for the particular redundancy groups to be scanned (particularly useful in cases where the chance of a data coherence problem increases with the amount of activity (e.g, writes) within the storage system). The initiation can be performed automatically by the service processor, host adapter or some other system component.

Figure 6:
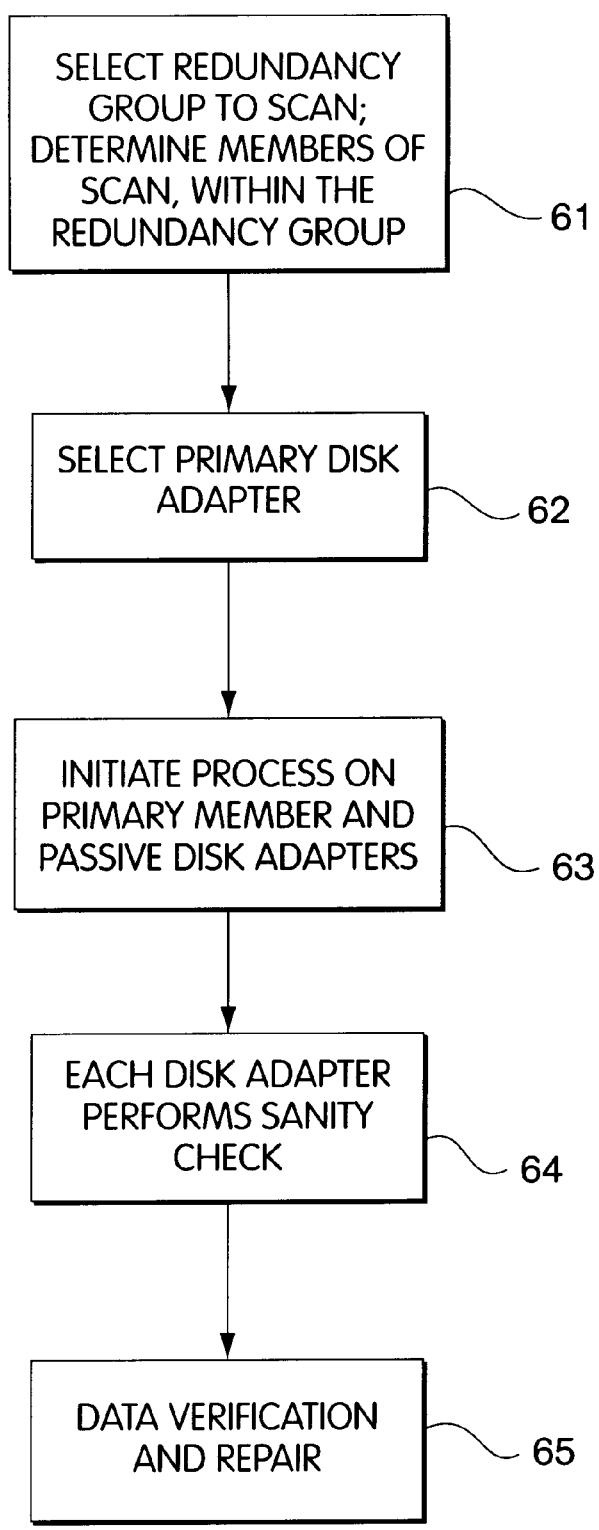
FIG. 6 illustrates one embodiment of a method for data verification and repair, according to the present invention.

FIG. 6 illustrates a method of performing data verification and repair in a storage system, such as the one illustrated in FIG. 4, where redundant information is stored in an array of disks. The method begins at a step 61, by selecting the redundancy group to scan. For example, the redundancy group 34 of FIG. 3 could be selected for data verification and scanned. In the alternative, the redundancy group 35, which uses a parity redundancy scheme, could be selected for data verification and repair. The selection can be made based on the factors described above, such as quantity of write activity.

For a given redundancy group, the storage segments on the physical devices which will participate in the data verification repair process are selected. For a redundancy group that includes mirrored data, this involves selecting which of the mirrors are included in the scan. Returning to FIG. 3, data verification can occur among all three physical storage devices 30–32 in redundancy group 34—checking all mirrored data. In the alternative, a subset of these mirrors could be selected. In the case of redundant information in the form of parity, all of the storage devices typically will be selected. This follows from the fact that the parity information (e.g., 37a of FIG. 3) is typically derived using data from all of the other physical storage devices in the redundancy group (e.g., from the applicable stored data in physical devices 30–32, in the redundancy group 35).

The step 61 can be performed manually or automatically using software written for a service processor connected to the storage system, such as the service processor 47 of FIG. 4. In the alternative, the initiation and selection of the redundancy group and members of the scan can be performed within the storage system, such as by the host adapter 42, or one of the disk adapters 45a–45d, or by some other mechanism.

At a step 62, a primary disk adapter is selected. In the illustrative embodiment, the primary disk adapter is the single storage system component responsible (through executing appropriate software) for managing the process of verifying and repairing data. In other embodiments, different components can be used to perform this function. As just one example, a separate processor can be added (or the service processor used) (and programmed) to manage the data verification and repair process. The primary disk adapter is preferably the disk adapter responsible for reading and writing information from at least one physical storage device that is included in the redundancy group being verified and repaired.

At a step 63, the data verification and repair process is initiated on the primary disk adapter and the passive disk adapters. The passive disk adapters are those disk adapters connected to a physical storage device included in the data verification and repair process, but which are not the primary disk adapter.

At a step 64 (which may be a part of the initiation process) a sanity check may be performed. This check may involve, for example, assuring that a particular data segment of physical storage is participating in no more than one data verification and repair process at a time. This would prevent, for example, a data verification process proceeding on physical storage devices 31 and 32 for the redundancy group 34 (of FIG. 3), at the same time that a separate data verification scan is proceeding for all three physical storage devices 30–32 that contain data for redundancy group 34.

Finally, at a step 65, the data verification and repair process is performed. An example of this process is described in greater detail below.

Figure 7:
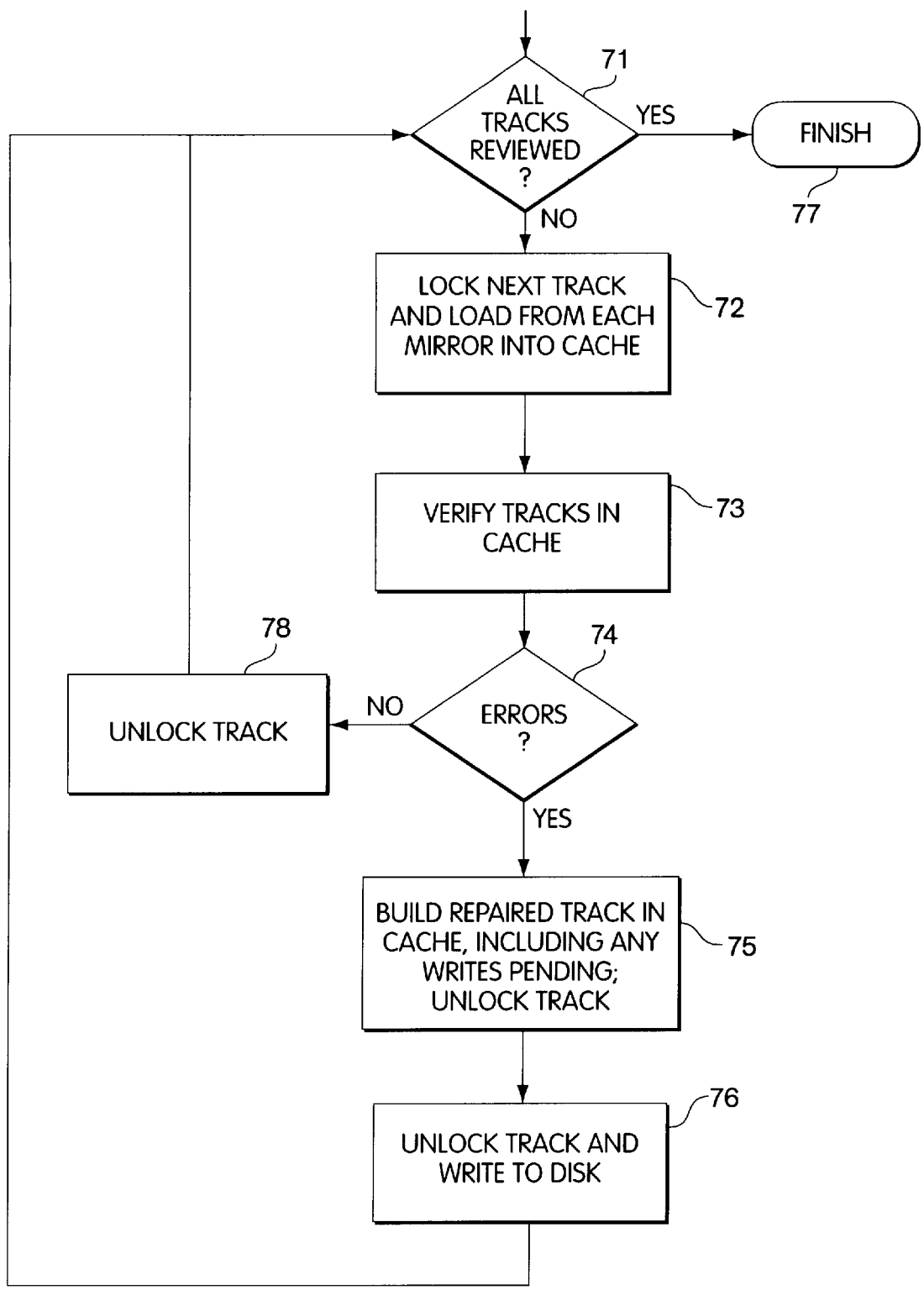
FIG. 7 illustrates one embodiment of a method according to the present invention for verifying and repairing potentially inconsistent mirrored data.

FIG. 7 illustrates one embodiment of the present invention for performing the data verification and repair process (e.g., step 65 of FIG. 6). In this particular embodiment, data is verified and repaired on a track by track basis. That is, each track in the mirror group is examined one at a time. In this embodiment, the process is controlled by (software stored on and executed by) the primary disk adapter, although (as noted above) other mechanisms could be used.

At a step 71, the process begins by determining if all tracks have been reviewed. If all of the tracks have been reviewed, then the data verification process is complete and the process can conclude, at a step 77. Of course, when the process is first initiated, there should be tracks that have not yet been verified and repaired.

At a step 72, the next track to be verified and repaired is selected. There should be a corresponding track in each of the mirrors, all of which are selected.

At step 72, the selected tracks are "locked." That is, no new writes are permitted to be made to any record on these tracks. In the event that a write command is received by the data storage system 40, the written information is held in cache 44a until the track is unlocked. After the data verification and repair process is complete, the corresponding information can be written to this track, as described below.

At step 72, each selected track is loaded from each mirror into the cache 44a. In this embodiment, this is achieved by the primary disk adapter issuing a read track command to each of the passive disk adapters, corresponding to reads for each mirror that is participating in the verification and repair process. At the same time, the primary disk adapter proceeds to read its own corresponding track of data and write it into cache 44a. In response to the command from the primary disk adapter, each of the passive disk adapters reads the applicable track of data and writes it into the cache 44a. When the write is complete (or failed), the passive disk adapter communicates this by storing a message in the cache mailbox 44b indicating (1) that the data has been successfully transferred to cache (or, in the alternative, that the read process failed) and (2) (assuming that the reading of information was successful) a pointer to the location in the cache 44a where the track of data is stored.

At a step 73, the primary disk adapter verifies the tracks of information now stored in the cache. One embodiment of a verification process is described in greater detail below.

At a step 74, if all of the tracks were successfully read, and the data agrees for all of the tracks, then there are no errors and no disk repair that is required. In this event, no errors have been discovered and processing can continue at a step 78 by unlocking the track that was just examined. Once the track has been unlocked, any writes that have been held pending during the verification and repair process can then be made, as is normally done. In addition, the data verification and repair process can continue at step 71, by determining if any tracks are in the mirror group that still need to be examined.

In the event that an error is found, an applicable log may be made, and/or the service processor 47 notified.

Optionally, the storage system can attempt to repair the discovered data coherence problems. At a step 75, a repaired track is constructed from the tracks stored in the cache 44a. This process is described in greater detail below, and may include merging the repaired record with any writes that have been made while the track has been locked. (If a write is made which changes the format of the track during verification, however, the verification and repair process may issue an error code indicating that verification is no longer meaningful because this format is changing, and terminate.)

At a step 76, the track is unlocked and the repaired (and updated, if necessary) track is written to disk. Data verification and repair is then complete for this track, and processing can continue at step 71, as described above.

The data verification and repair processes of the above embodiment can be different, depending on what type of redundancy is used. That is, the method for verification and repair of a mirrored redundancy group may be different than the verification and repair process used for a redundancy group that employs a parity scheme.

Data Verifcation and Repair in Mirror Groups

In one embodiment of the present invention, the data verification and repair process for a mirror redundancy group is accomplished through a process of constructing a table recording which data records are verified, and which are invalid.

Figure 8:
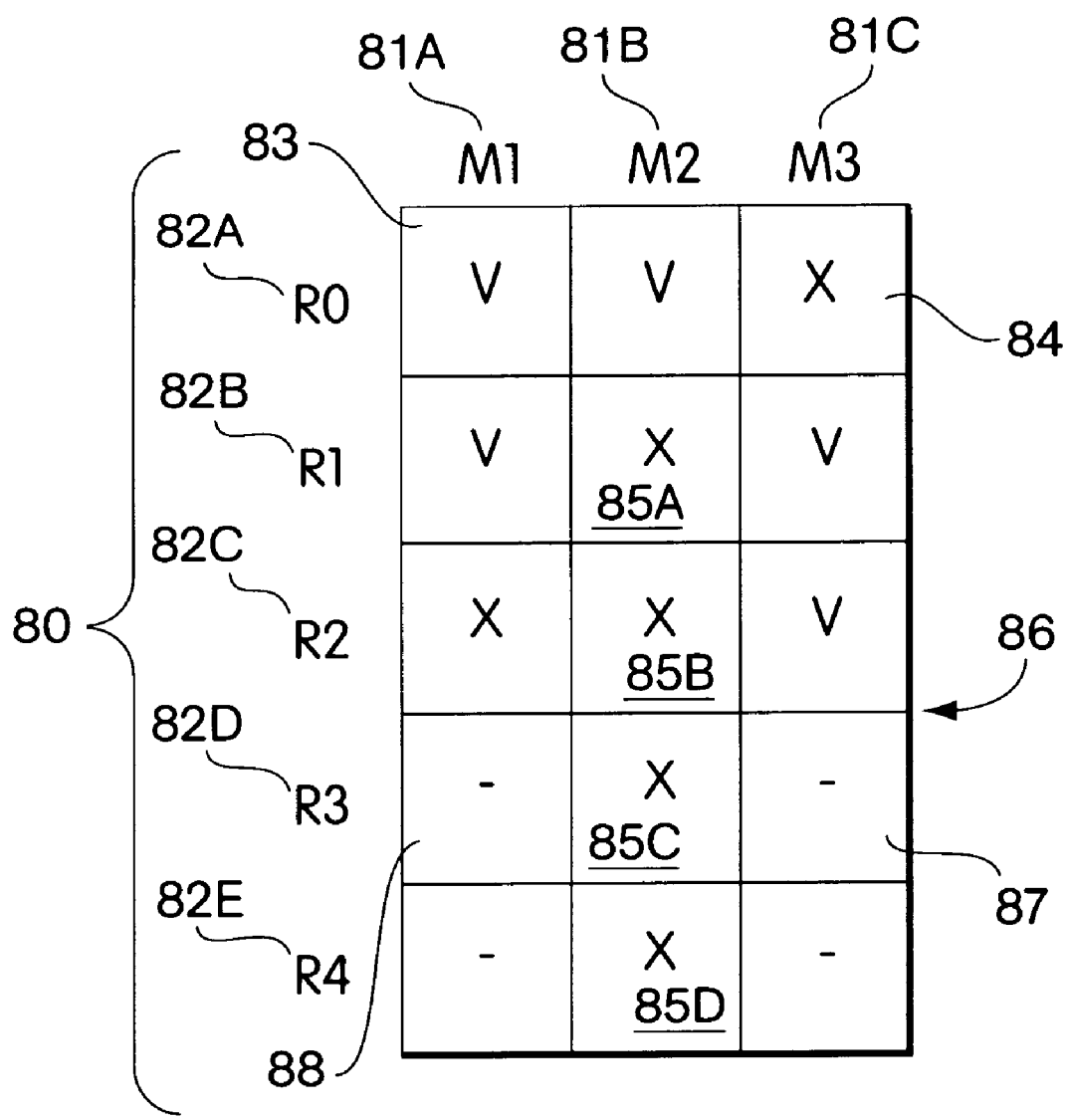
FIG. 8 illustrates one example of a table that may be used in implementing the methods of FIGS. 9 and 10.

FIG. 8 illustrates an example of such a data verification table 80. This particular example includes three columns 81a–81c, corresponding to three mirrors within a redundancy group—M1, M2 and M3. The table further includes a number of rows 82a–82e. Each row represents a record stored within the track being examined (e.g., R0–R4). The process of verification can proceed by completing this table. For example, during the verification process, entry 83 may be marked as a verified data entry ("V"). Thus, the record R0 on mirror M1 is marked as verified to have the correct data.

Similarly, data that is not verified (e.g., has failed to be updated or cannot be read from the track) can be marked as an invalid data entry. An example of this is illustrated at box 84, with an "X" indicating that record R0 on mirror M3 contains old data. In the verification table 80, a number of entries may indicate that data has not yet been examined, e.g., indicated by a "–". For example, box 87 indicates that, at this point in the verification and repair process, record R3 on mirror M3 has not yet been verified or determined to be invalid. The manner of verifying records, and thereby completing the verification table 80, is described below.

Of course, there are many alternatives to building a data verification table. As just one example, a corrections slot can be configured on the fly during the verification process.

Figure 9:
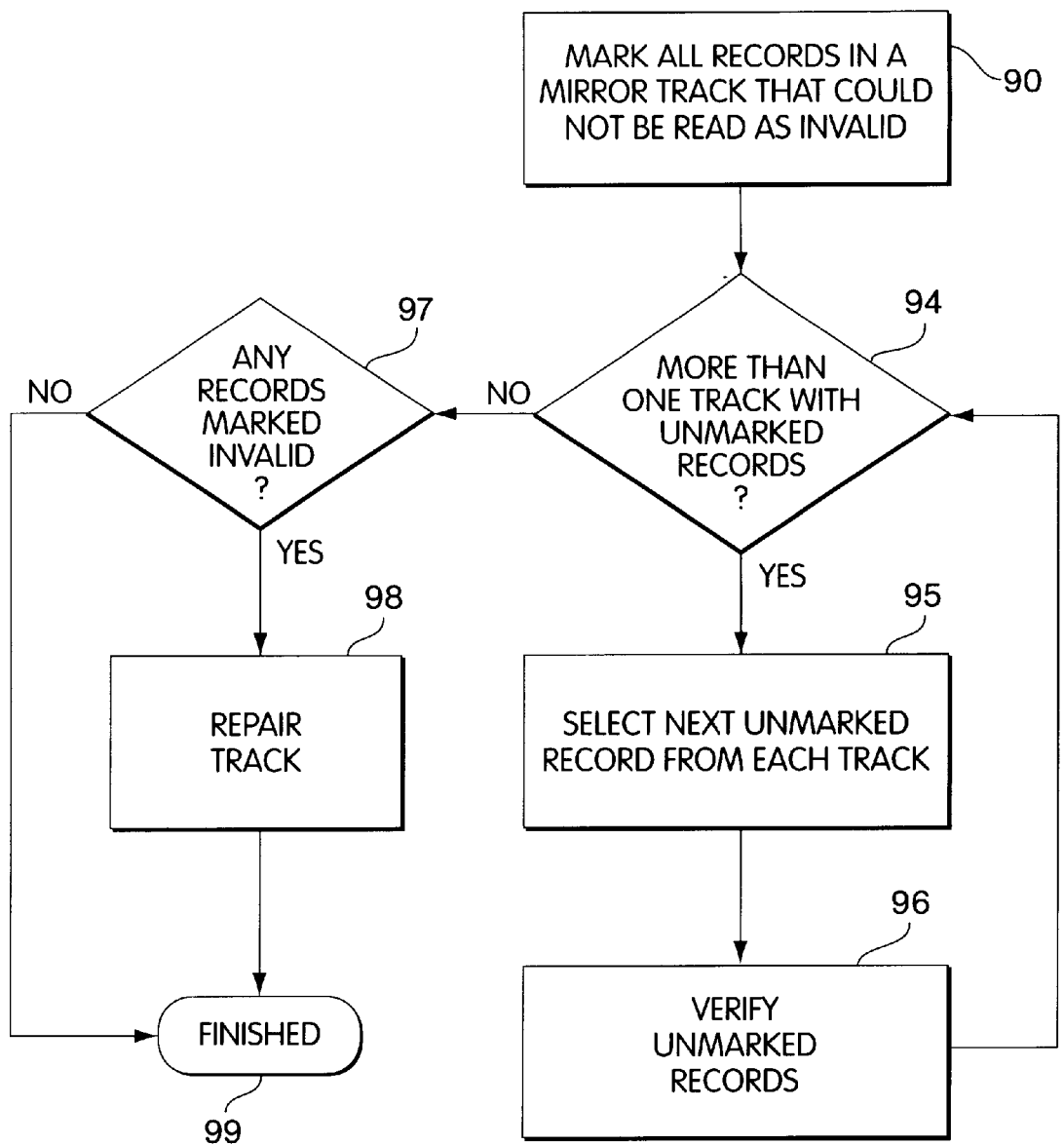
FIG. 9 illustrates one embodiment of a method according to the present invention for checking and repairing tracks within a mirrored data group.

FIG. 9 illustrates one method for verifying data within a mirror group. As described above, this process may be performed by the primary disk adapter (or some other component), using the tracks of information as stored in cache 44a.

At a step 90, the verification table 80 is marked for any mirror track that could not be successfully read. Thus, every record in a mirror track that could not be read is marked as invalid.

At a step 94, it is determined whether there is more than one track that includes unmarked records. If, for example, only one of the tracks could be read, the verification process may stop. This one track that could be read is the only track that contains updated data (or data of any kind at all, because the others could not be read). (A log of the diagnosis of the existing system may be created, or the service processor 47 notified, throughout the process for later examination. This may be done at any step where data is verified or found invalid.) Accordingly, processing can continue at a step 97.

If, however, there is more than one track with unmarked records, then the data can be verified among the tracks with unmarked records.

At a step 95, the next record from each track is selected where there is more than one unmarked column (any unmarked record in a row with only one column unmarked is presumed correct—otherwise the data is completely lost). For example, referring to the verification table 80 of FIG. 8, the next record with unmarked entries is record R3, corresponding to row 82d. In particular, the record R3 as it appears on mirror M1 (column 81a) and mirror M3 (column 81c) has not been marked as verified or invalid (indicated by the "–").

At a step 96, the unmarked records are verified. Verification of unmarked records is described in greater detail below. As a result of the verification process, the corresponding entries in the verification table (e.g., entries 87 and 88 of FIG. 8) are marked.

The remaining records of the verification table may then be completed in the same manner, by repeating steps 94 through 96.

At a step 97, it is determined whether any records in all of the tracks being examined were marked as invalid. If not, the data has been verified and the process is complete. Accordingly, the process finishes at a step 99.

If, however, some records were marked invalid, then the track mirrors containing invalid records may be repaired.

At a step 98, the track is repaired. This may be accomplished in the following manner. A column of the corresponding verification table may be selected, preferably the column with the most records marked as verified. A complete, up to date track can then be constructed by replacing any records in this track that are marked as invalid with the corresponding records in other mirrors. (Of course, if a corrected track cannot be constructed, the track cannot be repaired and the service processor is notified.) Any writes pending for the reconstructed track are then merged into the existing track, in the same fashion as would generally occur in writing new information to a track on a disk. Once the track has been reconstructed, it may be written to each device (mirror) in the mirror group that is part of the scan process. (Of course, data may be updated other than through a full-track write.)

In the event that not all mirrors in a mirror group are participating in a scan (e.g., not all mirrors in the group were selected at step 61 of FIG. 6), then all or only the scanned mirrors may be written. In this case, the mirrors in the mirror group that are not verified or corrected may be marked as invalid (using a mask field in corresponding records in the updated track or some other mechanism).

Figure 10:
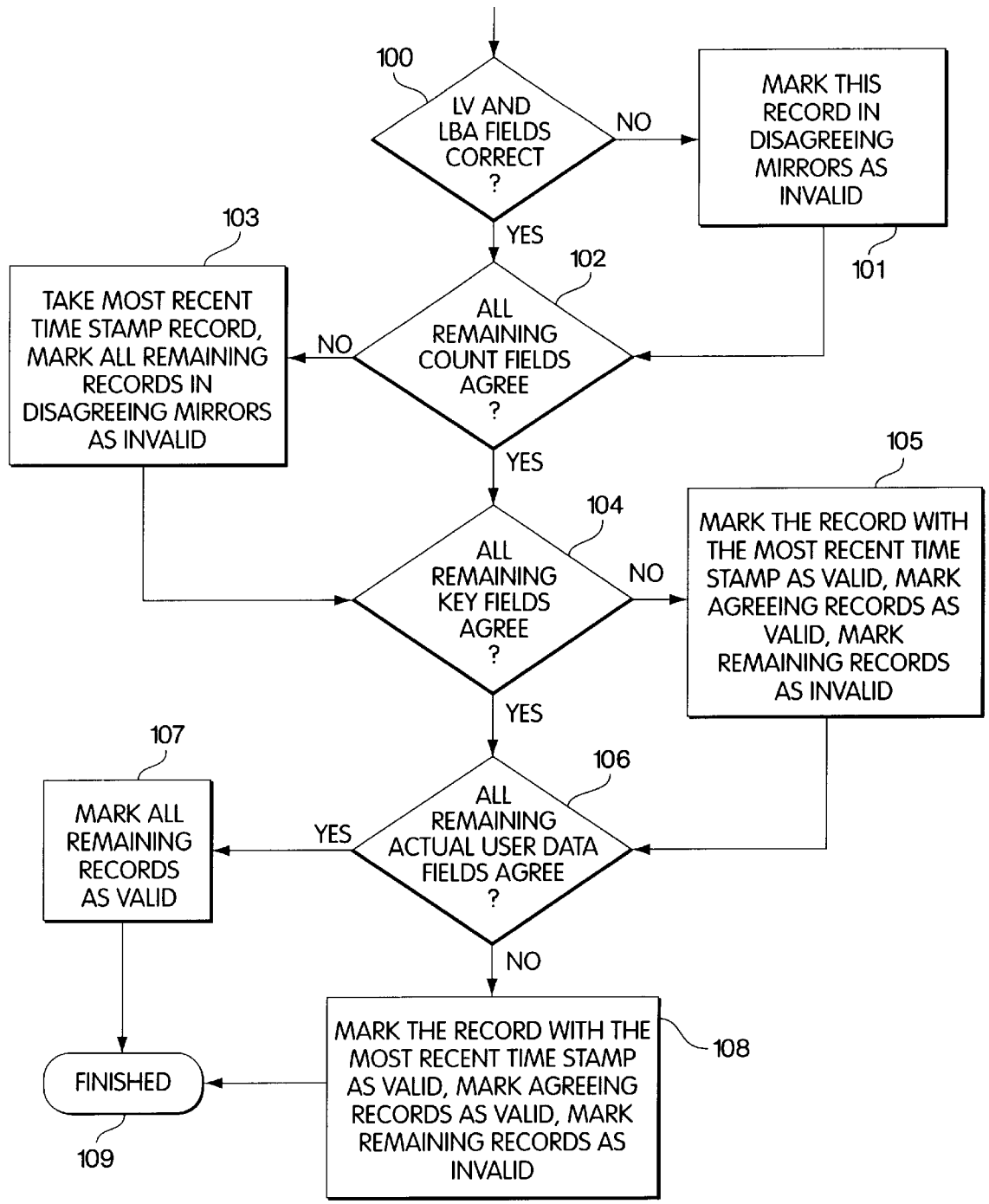
FIG. 10 illustrates one embodiment of a method according to the present invention for verifying records in a mirrored group and marking a table such as the one illustrated in FIG. 8, accordingly.

FIG. 10 illustrates one embodiment of a method for verifying records (e.g., step 96 of FIG. 9). The verification begins at a step 100 by examining the logical volume and logical block address fields for the record. In this embodiment, the logical volume and/or logical block address fields are known in advance of verifying the particular records. Accordingly, the stored value for these fields can be checked against the expected value. If the stored values are correct, there is no reason to invalidate any of the mirrored records and processing can continue at a step 102. If, however, there is one or more records that have incorrect logical volume and logical block address fields, then data was incorrectly written onto this track (for example, by a write that was actually intended for a different address). In this case, at a step 101, the record on the track with the incorrect logical volume or logical block address field is marked as invalid in the corresponding verification table.

At a step 102, the count fields of the remaining records (i.e., the records being verified which have not already been marked as invalid) are examined. If all of the count fields agree, there is no reason to invalidate any of the records currently being examined, and processing can continue at a step 104. If there is a discrepancy among the count fields, however, the record bearing the most recent time stamp is selected as being the most likely to be correct. Accordingly, any record disagreeing with the record bearing the most recent time stamp is marked as invalid. In addition, if the count field in a record is invalid, then all subsequent records on the track may no longer be trusted. Accordingly, all of the remaining entries in the verification table (all entries in this column, below this record) for records in a track that includes a disagreeing count field are marked as invalid. Processing can then continue at step 104.

At step 104, the remaining format fields of the remaining records are examined. If the remaining format fields agree, there is no reason (yet) to invalidate any existing records and processing can continue at a step 106. If, however, there is a discrepancy among these fields, then the most recent time stamped record is again presumed to be correct and any disagreeing records are marked as invalid, at a step 105.

At step 106, correspondence among the data fields of the remaining records is examined. This may be done by sequentially comparing all data items in the records (e.g., data word by data word, or by XORing to and checking to see if the resulting values are all zeros).

A particularly advantageous procedure for checking agreement among the fields is to first check whether the redundancy/error correction code fields agree (assuming that the error correction code fields are not generated using a field in the record that may vary across the mirrors, such as the time stamp field). If there is a disagreement on the parity information, then there is necessarily a disagreement among the records. Accordingly, checking of the redundancy fields first can serve as a "quick and dirty" substitute for checking all of the data items in the record. In the alternative, checking the error correction code fields can simply be done as a first step in verifying the data fields, permitting easy and more rapid identification of most instances where the data fields disagree.

The speed of checking consistency of the data can also be increased by checking the mask fields before (or instead of) engaging in an exhaustive check of the data fields. If a mask indicates that one of the records on one of the mirrors is invalid, this record can only contain valid data if it bears a time stamp more recent than the time stamp corresponding to the mask. A preliminary screening using the mask fields may, therefore, avoid the need to completely check the data field, in some circumstances.

The order of checking of the error code, the mask and the key fields can, of course, be rearranged. For example, mask fields may be checked, followed by error codes, then key fields.

If all of the remaining records agree, at step 106, then all of the remaining records may be marked as valid in the verification table, as shown at a step 107. If there is a disagreement among the data fields, then the record with the most recent time stamp, together with any records agreeing with this record, are marked as verified records. All remaining (disagreeing) records are marked as invalid. Because the disagreement came in the values of the data field, however, subsequent records in tracks having an invalid record need not be marked as invalid.

After performing these steps, the records have been verified, the verification table appropriately updated, and the process is finished at a step 109.

While the above has been described with reference to the CKD format, the method may be readily adapted to an FBA format, based on the disclosure provided herein. For example, an FBA formatted architecture may include the same or similar fields as in the CKD data, although the length of the data field is fixed and the count and key fields omitted. In this case, the logical volume, time stamp, data and error correction code fields may all be present or added to facilitate data coherence verification (indeed, even a "count" field could be added to physical storage of an FBA block). Accordingly, the same general method may be employed. The most obvious difference being that checking of the count and key fields (steps 102 and 104 of FIG. 10) may be omitted, and the ability to conclude that all subsequent records on a track are invalid due to a format discrepancy (such as length of a record) earlier on the track may be limited.

Data Verification and Repair in Systems with Parity Redundancy

The general method of verifying and repairing data in a parity redundancy group is analogous to the above method. For example, a primary disk adapter can be selected for examination of a redundancy group on a track-by-track basis, e.g., locking an individual track, writing the entire track from each applicable physical storage device to a cache, and then examining all of the data/parity information for that track before examining the next track. As for the above embodiment, of course, the advantages of the invention may be achieved using other design parameters.

While the following embodiment is described with respect to parity redundancy groups, the following can be adapted to systems that use more than one bit of redundant information (such as a RAID 2 system using Hamming codes). Thus, the following methods are generally applicable to storage systems including those employing RAID 2 through 7 redundancy schemes, and the many variations of these methods.

The procedures of FIG. 7 may be adapted for use with parity redundancy groups. That is, data verification and repair can proceed on a track-by-track basis. The data verification process, however, can be more difficult. Without direct mirroring of data, a direct comparison of data stored on disk drives may not be possible.

Figure 11:
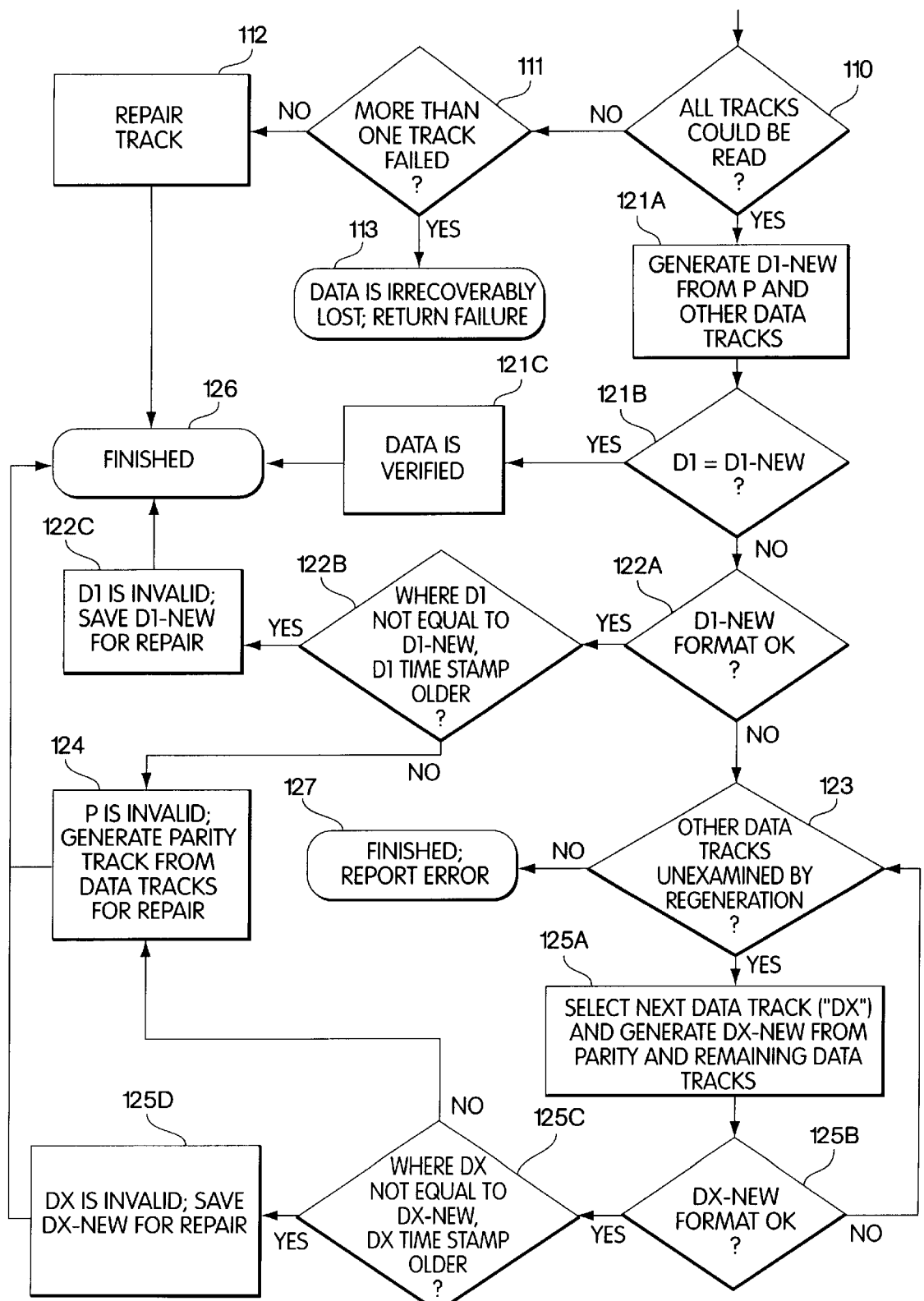
FIG. 11 illustrates one embodiment of a method according to the present invention for verifying data and parity in a storage system employing parity redundancy.

FIG. 11 illustrates a method according to one embodiment of the present invention for verifying tracks of data read into a cache, generally according to the procedure of FIG. 7, for verifying and repairing parity redundancy group data.

At a step 110, the primary disk adapter verifies that each of the tracks could be read into the cache. If not, at a step 111, the primary disk adapter determines if the read for more than one track failed. If so, at a step 113, it is determined that data has been irrecoverably lost (assuming a single parity bit, this system cannot recover from loss of more than one data source). Accordingly, the service processor 47 (of FIG. 4) is notified and some other mechanism for recovery identified.

If only one track failed, at a step 112, that track may be repaired. This corresponds to the repair of the loss of a single physical storage device, as ordinarily contemplated in any RAID system.

If all the tracks can be read, at step 110, then the verification process continues.

The remainder of the method illustrated in FIG. 11 can be better understood with reference to an example. The examples assume that the redundancy group has two data segments for every parity segment and, accordingly, two data tracks D1 and D2 and one parity track P are examined together.

One way of verifying data coherence, as shown at a step 121a, is to generate a new data track from the other data tracks and the parity track and determine if the correct result is reached. In this particular embodiment, the first data track is selected. Accordingly, a new track of user data is generated from the parity track and the other data tracks. In the example above, therefore, a "D1 new" track is generated from the parity field and the D2 data track (where simple parity is being used), by simply XORing the values of the parity track and the D2 data track. (While the examples refer to comparison of entire tracks at a time, different units may, of course, be used.)

At a step 121b, it is determined whether the newly generated D1-new track is the same as the D1 track as stored on disk. This examination may be achieved in the same manner as done for mirror data. That is, the D1-new (newly generated D1) track may be viewed as a "mirror" track of the old D1 track. If the two mirrors all have the same values, there is no data coherence problem. Accordingly, the determination of whether D1 is equal to D1-new, at step 121b, can be performed generally as described above with reference to FIG. 10 (for CKD formatted data, or as described generally above for data formatted in other ways). In the alternative, D1-new may be XORed with D1. If all values are equal to zero, D1 equals D1-new. Preferably the check in step 121b is performed as quickly as possible since, for most of the verification process, the step 126 results in verification and additional examination is not required.

Thus, if the old D1 track is equal to the newly generated D1-new track, there is no data coherence problem; the track has been verified (step 121c); and verification of this track is complete (step 126).

If the regenerated D1-new track does not correspond to the D1 track, the existence of a data coherence problem has been detected.

There are two possibilities once the existence of a data coherence problem has been identified. One of the data units may not have been updated, even though the parity information corresponding to that update has been made. In the alternative, one of the data units may have been updated, but the parity unit not updated. Put another way, the writing of data in a parity redundancy group involves writing (1) the new data; and (2) updating parity to correspond to the new data. For example, if data on the D1 track is updated during normal operation, this would result in new data being written to the D1 track and also to the P track. If there is a data coherence problem, it arises from writing either D1 or P, but failing to write the other. In this case, D1 has new/updated data and D1-new has the old (not updated) version of D1, or vice versa. (The first corresponds to failure to update parity, while the second corresponds to a failure to update D1 when parity was updated.) Consider, however, a data coherence problem arising from updating either D2 or P, but not both. When D1-new is generated by XORing D2 and P, the result may be "garbage"—it will not correspond to any actual D1 (old or updated). That is, the XOR of P and D2 will generate a track of data that does not correspond to any track ever written to memory. This is handled through format checking of D1-new and other mechanisms, as described below.

During step 121b (or as a part of step 121b), any discovered difference between D1 and D1-new can be saved for analysis to determine if the difference identifies the data coherence problem.

At a step 122a, the D1-new track is examined to determine if it is a viable track (i.e., is internally consistent with respect to its format and other parameters). If D1-new is not viable, then the coherence problem must have arisen from failure to update data on a different track (or the parity track when that data was written) because D1-new is "garbage."

The step 122a may proceed as described with reference to FIG. 12, below.

In some architectures, such as standard FBA format, there may be insufficient formatting fields (where the correct value is known in advance) to have confidence that a regenerated track is in a viable format that corresponds to a real track of data (old or new) and is not garbage. In this case, the system might be configured only to identify the existence of a data coherence problem, but not attempt to solve it. In the alternative, the structure of storing data in the disks may be altered to include a field having a known value or other fields. The addition of this type of field would enhance the determination at step 122a of whether the D1-new track is truly a reconstructed track or garbage.

Assuming that the D1-new data field is a viable track (passes the format check), at step 122b, the D1-new time stamp is checked against D1 for any record where D1 and D1-new are different. If the D1-new stamp is more recent, then D1-new contains the correct, updated data. At a step 122c, therefore, D1 is concluded to be invalid. In addition, the corrected values for D1 have already been generated, i.e., D1-new. Accordingly, D1-new may be saved for use in updating D1.

In the alternative, if D1 bears the newer time stamp, the data coherence problem arose from a failure to update parity when D1 was updated. Accordingly, at a step 124, P is determined invalid and the repair process may proceed.

Once this is done, the data coherence problem has been identified; examination of this track may be complete; and the process may conclude at a step 126.

In the alternative, however, the remaining data tracks may be examined (i.e., proceeding from step 124 to step 123). This can provide an additional level of security that the correct data coherence problem has been identified. If other potential data coherence problems are flagged, the process can notify the service processor 47 that additional analysis is required.

In the embodiment of FIG. 11, it is assumed at step 122c that the correctness of the format in D1-new is sufficient to identify the exact data coherence problem—failure to update D1 although the P unit was updated, or vice versa. If the nature of the formatting is insufficient to draw this conclusion at this point, then other data tracks may still be examined, by continuing at step 123. If more than one possible data coherence problem is identified, a complete log of the possible data coherence problems can be generated for a further examination of what data coherence problem or problems may exist on this track. This situation may arise, for example, in the event that a write to one data track (e.g., D2) but not parity does not result in a format violation when another track (e.g., D1-new) is generated from parity and the one data track (e.g., D2 XOR P). D1-new will have a correct format but the data coherence problem actually exists elsewhere.

Returning to step 122a, if the D1-new format has been determined not to be viable, then the D1-new unit is simply garbage data. The data coherence problem has not yet been identified—the problem is either a failure to update parity or data on a different disk in the redundancy group. Processing continues, therefore, at a step 123.

At step 123, it is determined whether any other data tracks have not been examined. Once all of the data tracks have been examined, processing is complete. This should occur, however, only in an embodiment where processing continues even after a data coherence problem has been identified (e.g., after step 122c). If there are no remaining tracks to regenerate at step 123 in the embodiment illustrated in FIG. 11, where processing does not continue once a data coherence problem has been identified (at step 122c, 124 or 125d), then a problem was found to exist (at step 121b), but not located. Accordingly, an error is reported at step 127.

Accordingly, at a step 124, the parity unit is marked as invalid and the data units are marked as verified. A correct parity unit may be generated from the data units (since these are already in cache) at this time, or at the time that the parity unit is updated later in the repair process.

If not all of the data tracks have been examined by regeneration, then one of the data units is selected ("DX"), and a potential "mirrored" data track is generated, "DX-new." This is done, as for D1-new, by generating the DX-new unit from the parity and remaining data tracks.

At steps 125b–125d, DX-new is examined and compared with DX, to determine if this identifies the data coherence problem. Steps 125b–125d proceed and correspond to the steps 122a–122c, described above—the difference being that a track other than D1 is being examined.

Figure 12:
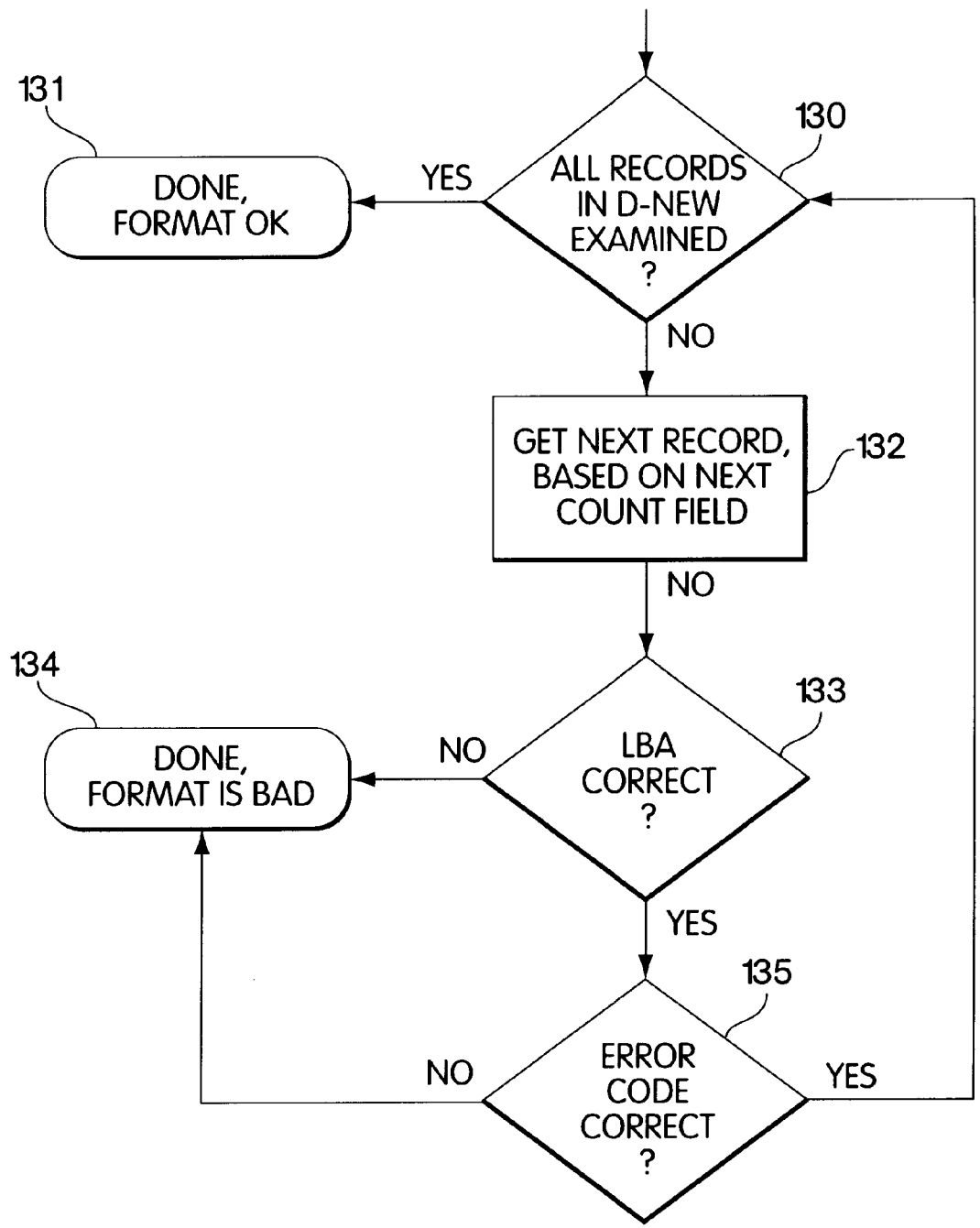
FIG. 12 illustrates one embodiment of a method for verifying data format in a regenerated track.

FIG. 12 illustrates one embodiment of a method for determining if a regenerated track is in a viable format (steps 122a and 125b of FIG. 11). Processing begins at a step 130 where it is determined if all of the records in the regenerated track ("D-new") have been examined (at the start, none have been examined yet). If so, then the format is viable, and the process is completed at step 131.

If there are records in D-new that have not been examined, processing continues at a step 132. At this step, the next record is retrieved. In this particular embodiment, the records are CKD format records. In a CKD format, a count field specifies the length of the record. Accordingly, the next record is examined, assuming that the count field is correct.

At step 132, the logical block address is examined to determined if it is correct. If the logical block address is wrong, then the format of D-new is bad, and processing is complete at a step 134. At step 133, fields other than or in addition to the LBA field of a record may be examined. In particular, any field for which the value is already known or for which the possible values are constrained (including the count field, or as another example, a time stamp—which cannot be more recent than the current time on the system) may be examined to increase the assurance that D-new does not include garbage data. (Again, the order of examination, may also be rearranged.)

At a step 135, a further check may be made. In particular, assuming that the record is in the correct format, an error code for the record is generated and compared with the stored error code. If the error codes are the same, then this record is not be ruled out as having a format which is not viable. If the error codes are different, then the record fails the format check, and D-new is presumed to be in a format which is not viable (step 134).

Having thus described at least one illustrative embodiment of the invention, various modifications and improvements will readily occur to those skilled in the art and are intended to be within the scope of the invention. Accordingly, the foregoing description is by way of example only and is not intended as limiting. The invention is limited only as defined in the following claims and the equivalents thereto.

What is claimed is:

1. A method of diagnosing a data coherence problem in a storage system that includes a plurality of storage devices, each storing a data segment, the storage system storing redundant information corresponding to the data segments, the method comprising steps of:

(a) providing a first copy of one of the data segments;
   (b) using the redundant information to generate a corresponding copy of the one data segment; and
   (c) comparing the first copy with the corresponding copy to determine when a data coherence problem exists between the first copy and the redundant information.

2. The method of claim 1, wherein the data segments are in a parity redundancy group.

3. The method of claim 1, wherein the redundant information comprises parity data stored in one of the data segments.

4. The method of claim 1, further comprising a step of:
   (d) when a data coherence problem is found at step (c), identifying which among the one data segment and the redundant information is not up to date.

5. The method of claim 4, wherein the step (d) comprises a step of comparing a time stamp corresponding to the first copy with a time stamp corresponding to the corresponding copy.

6. The method of claim 4, further comprising a step of repairing the one of the data segments and the redundant information identified in step (d).

7. The method of claim 1, wherein each data segment is a track of data storing a plurality of data units, each data unit being a CKD record.

8. The method of claim 1, wherein each data segment is a fixed size block.

9. The method of claim 1, wherein each data segment is a track of data storing a plurality of data units, each data unit being a fixed size block.

10. The method of claim 1, wherein:

the data segements are in a redundancy group; and the steps (a), (b) and (c) are repeated for each data segment in the redundancy group that includes actual user data, independent of whether any potential data coherence problem is identified with respect to other data segments.

11. The method of claim 1, wherein the first copy includes actual user data.

12. The method of claim 1, further comprising a step (e) of determining whether the corresponding copy is a viable data segment.

13. The method of claim 12, wherein the step (e) is performed before the step (c).

14. The method of claim 12, wherein the step (e) comprises steps of:

generating an error code for a data unit in the corresponding copy; and comparing the generated error code with an error code in the corresponding copy.

15. The method of claim 12, wherein the step (e) comprises steps of:

determining an expected value for a field in a data unit in the corresponding copy; and comparing the expected value with a stored value stored in the data unit.

16. The method of claim 15, wherein the expected value is a logical block address.

17. The method of claim 12, wherein the step (e) comprises a step of:

(f) determining when a field of a data unit in the corresponding copy is within a range of expected values for the field.

18. The method of claim 17, wherein the step (f) comprises a step of examining a time stamp field.

19. A storage system comprising:

a plurality of storage devices, each storing a data segment, the data segments being in a redundancy group that includes redundant information; and a data coherence tester, coupled to the storage devices, to generate a corresponding copy of one data segment and to compare a first copy of the one data segment with the corresponding copy to determine when a data coherence problem exists between the first copy and the redundant information.

20. The storage system of claim 19, wherein the redundancy group is a parity redundancy group.

21. The storage system of claim 20, wherein the data coherence tester comprises means for identifying which among the one data segment and the redundant information is not up to date, when a data coherence problem is found.

22. The storage system of claim 21, wherein the data coherence tester comprises means for comparing a time stamp corresponding to the first copy with a time stamp corresponding to the corresponding copy.

23. The storage system of claim 21, further comprising means for repairing the data segment identified by the means for identifying.

24. The storage system of claim 20, wherein the data coherence tester comprises:

means for generating corresponding copies of each of the data segments that include actual user data, independent of whether any potential data coherence problem is identified with respect to other data segments.

25. The storage system of claim 20, wherein the first copy includes actual user data.

26. The storage system of claim 20, wherein the data coherence tester comprises means for determining whether the corresponding copy is a viable data segment.

27. The storage system of claim 26, wherein the means for determining comprises:

means for generating an error code for a data unit in the corresponding copy; and means for comparing the generated error code with an error code in the corresponding copy.

28. The storage system of claim 26, wherein the means for determining comprises:

means for determining an expected value for a field in a data unit in the corresponding copy; and means for comparing the expected value with a stored value stored in the data unit.

29. The storage system of claim 28, wherein the expected value is a logical block address.

30. The storage system of claim 26, wherein the means for determining comprises means for determining when a field of a data unit in the corresponding copy is within a range of expected values for the field.

31. The storage system of claim 30, wherein the system means for determining when a field comprises means for examining a time stamp field.

32. A storage system comprising:

a plurality of storage devices, each storing a data segment, the data segments of data being in a redundancy group that includes redundant information;

means, coupled to the plurality of storage devices, for generating a corresponding copy of one data segment; and means, responsive to the means for generating, for comparing a first copy of the one data segment with the corresponding copy to determine when a data coherence problem exists between the first copy and the redundant information.

* * * * *